United States Patent
Chen et al.

(10) Patent No.: US 10,340,547 B2
(45) Date of Patent: Jul. 2, 2019

(54) FABRICATION METHOD OF BATTERY

(71) Applicant: DELTA ELECTRONICS, INC., Taoyuan (TW)

(72) Inventors: Chin-Ming Chen, Taoyuan (TW); Yen-Kai Peng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 417 days.

(21) Appl. No.: 14/587,860

(22) Filed: Dec. 31, 2014

(65) Prior Publication Data
US 2015/0372341 A1 Dec. 24, 2015

(30) Foreign Application Priority Data
Jun. 23, 2014 (TW) .............................. 103121500 A

(51) Int. Cl.
*H01M 10/04* (2006.01)
*H01M 10/058* (2010.01)
*H01M 2/02* (2006.01)

(52) U.S. Cl.
CPC ..... *H01M 10/0481* (2013.01); *H01M 2/0275* (2013.01); *H01M 10/049* (2013.01); *H01M 10/058* (2013.01); *Y10T 29/49112* (2015.01)

(58) Field of Classification Search
None
See application file for complete search history.

(56) References Cited

U.S. PATENT DOCUMENTS

| | | | |
|---|---|---|---|
| 7,262,956 B2 | 8/2007 | Suzuki et al. | |
| 7,285,334 B1 | 10/2007 | Yamashita et al. | |
| 8,974,955 B2 | 3/2015 | Min et al. | |
| 2003/0118900 A1 | 6/2003 | Otohata | |
| 2005/0181242 A1 | 8/2005 | Suzuki et al. | |
| 2006/0019156 A1* | 1/2006 | Kim | H01M 2/021 429/161 |
| 2009/0075168 A1* | 3/2009 | Lee | H01M 2/021 429/176 |
| 2010/0297494 A1 | 11/2010 | Chen | |
| 2012/0107667 A1* | 5/2012 | Jeong | C01G 53/50 429/145 |
| 2012/0214055 A1 | 8/2012 | Schaefer et al. | |
| 2012/0231307 A1* | 9/2012 | Ha | H01M 2/06 429/82 |

(Continued)

FOREIGN PATENT DOCUMENTS

| | | |
|---|---|---|
| EP | 1 102 336 A1 | 5/2001 |
| JP | 2013-502672 A | 1/2013 |

(Continued)

*Primary Examiner* — Carmen V Lyles-Irving
(74) *Attorney, Agent, or Firm* — Muncy, Geissler, Olds & Lowe, P.C.

(57) ABSTRACT

A fabrication method of a battery includes the steps of providing an electrode group, a first sealing film and a second sealing film; bonding a part of a first surface of the first sealing film and a part of a first surface of the second sealing film by thermo-compression to form a sealed chamber, wherein at least one of the first sealing film and the second sealing film has a redundant part located outside the sealed chamber and without being bound by thermo-compression, and a part of the electrode group is disposed in the sealed chamber; and injecting an electrolyte into the sealed chamber.

7 Claims, 10 Drawing Sheets

(56) References Cited

U.S. PATENT DOCUMENTS

2013/0244093 A1    9/2013  Min et al.
2015/0037634 A1*   2/2015  Malcolm ............ H01M 10/482
                                                   429/90

FOREIGN PATENT DOCUMENTS

| JP | 2014032789 A | 2/2014 |
| TW | 200525801 A | 8/2005 |
| TW | 201246657 A | 11/2012 |
| WO | WO0062354 A1 | 10/2000 |

\* cited by examiner

FABRICATION METHOD OF BATTERY

CROSS REFERENCE TO RELATED APPLICATIONS

This Non-provisional application claims priority under 35 U.S.C. § 119(a) on Patent Application No(s). 103121500 filed in Taiwan, Republic of China on Jun. 23, 2014, the entire contents of which are hereby incorporated by reference.

BACKGROUND OF THE INVENTION

Field of Invention

The present invention relates to a fabrication method of a battery.

Related Art

In the conventional assembling, the pouch lithium-ion battery is clipped by several mechanical members (e.g. frames) or fixed by glue or adhesion. These assembling processes are complicated and have higher cost.

SUMMARY OF THE INVENTION

The present invention discloses a fabrication method of a battery including steps of: providing an electrode group, a first sealing film and a second sealing film; bonding a part of a first surface of the first sealing film and a part of a first surface of the second sealing film by thermo-compression to form a sealed chamber, wherein at least one of the first sealing film and the second sealing film has a redundant part located outside the sealed chamber and without being bound by thermo-compression, and a part of the electrode group is disposed in the sealed chamber; and injecting an electrolyte into the sealed chamber.

In one embodiment, the first sealing film has the redundant part located outside the sealed chamber and without being bound by thermo-compression.

In one embodiment, the method further includes steps of: providing a fixing member; and bonding the first surface of the redundant part of the first sealing film to the fixing member by thermo-compression.

In one embodiment, both of the first sealing film and the second sealing film have the redundant part located outside the sealed chamber and without being bound by thermo-compression.

In one embodiment, the method further includes steps of: providing a fixing member; aligning the first surface of the redundant part of the first sealing film to be opposite to the first surface of the redundant part of the second sealing film; and covering the first sealing film and the second sealing film by the fixing member and then bonding the first sealing film, the second sealing film and the fixing member by thermo-compression.

In one embodiment, the method further includes a step of: folding the redundant part of the first sealing film.

In one embodiment, the method further includes steps of: providing a fixing member; aligning the first surface of the folded redundant part of the first sealing film and the first surface of the redundant part of the second sealing film to face the same side; and covering the first sealing film and the second sealing film by the fixing member and then bonding the first sealing film, the second sealing film and the fixing member by thermo-compression.

In one embodiment, the method further includes a step of: folding the redundant part of the second sealing film.

In one embodiment, the method further includes steps of: providing a fixing member; aligning the first surface of the folded redundant part of the first sealing film and the first surface of the folded redundant part of the second sealing film to face different sides; and covering the first sealing film and the second sealing film by the fixing member and then bonding the first sealing film, the second sealing film and the fixing member by thermo-compression.

In one embodiment, the first surface of the first sealing film and the first surface of the second sealing film are thermoplastic layers.

In one embodiment, the thermoplastic layer is selected from the group substantially consisting of PVC, PE, PP or PS.

In one embodiment, each of the first sealing film and the second sealing film has a second surface, and the second surfaces are waterproof layers or protective layers.

In one embodiment, each of the first sealing film and the second sealing film further has a metal layer. The metal layer of the first sealing film is disposed between the first surface and the second surface of the first sealing film. The metal layer of the second sealing film is disposed between the first surface and the second surface of the second sealing film.

In one embodiment, the metal layer is made of aluminum, copper, iron or nickel.

In one embodiment, the first sealing film and the second sealing film are integrally formed.

As mentioned above, the fabrication method of a battery of the invention is to bond a part of the first sealing film and a part of the second sealing film by thermo-compression and to remain at least one of the first sealing film and the second sealing film to have a redundant part without being bonded by thermo-compression. Accordingly, it is possible to bond the redundant part with other mechanical member by thermo-compression so as to fix or assemble the battery. Accordingly, it is also possible to fold the redundant part so as to fix or assemble the battery.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
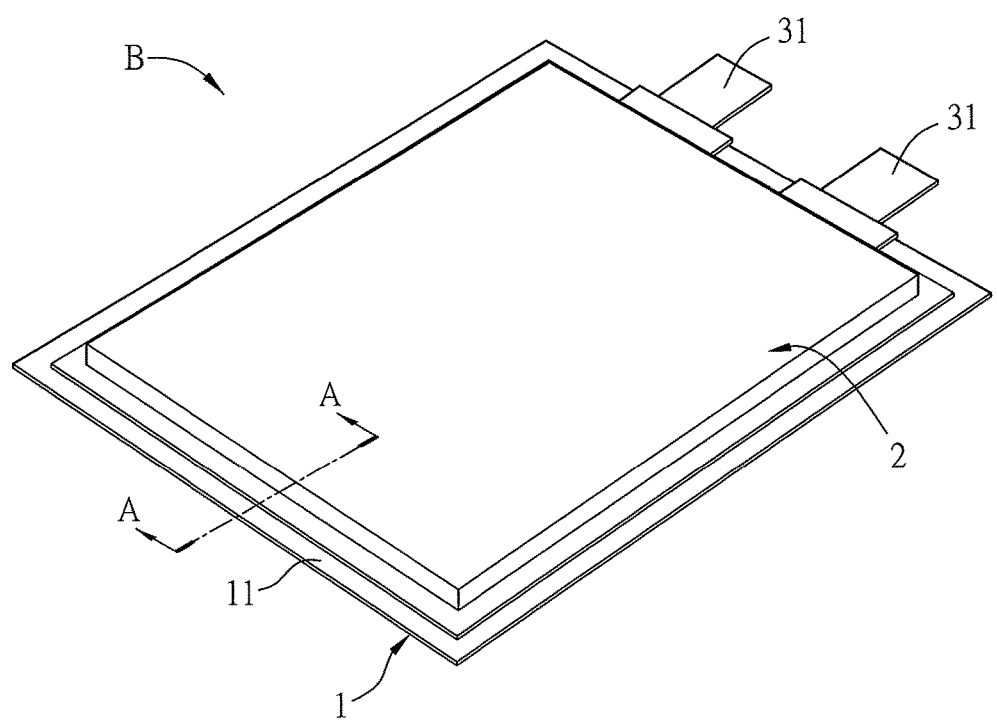
FIG. 1A is a schematic diagram showing a battery according to a preferred embodiment of the invention.
Figure 1B:
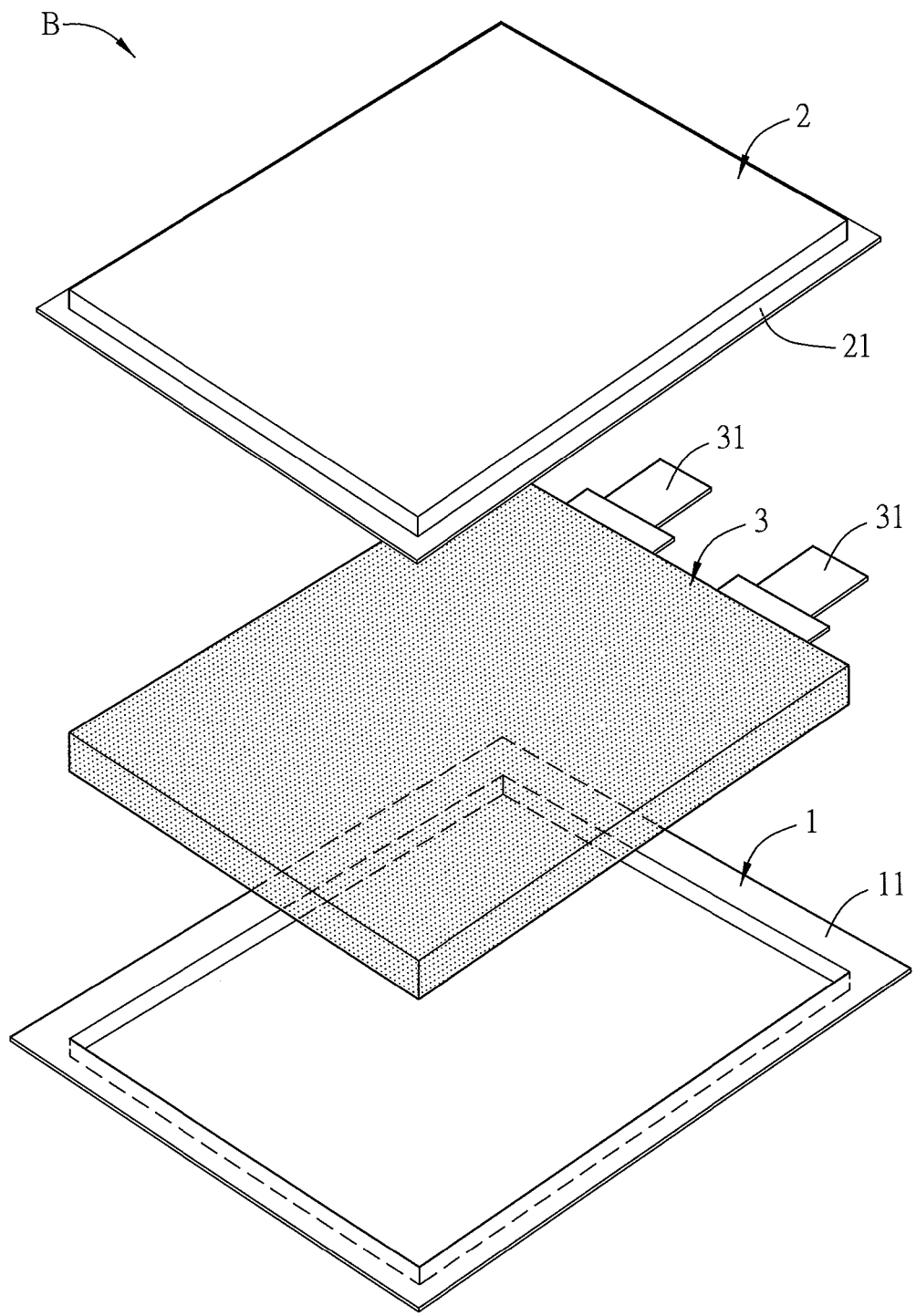
FIG. 1B is an exploded view of the battery according to the preferred embodiment of the invention.
Figure 2:
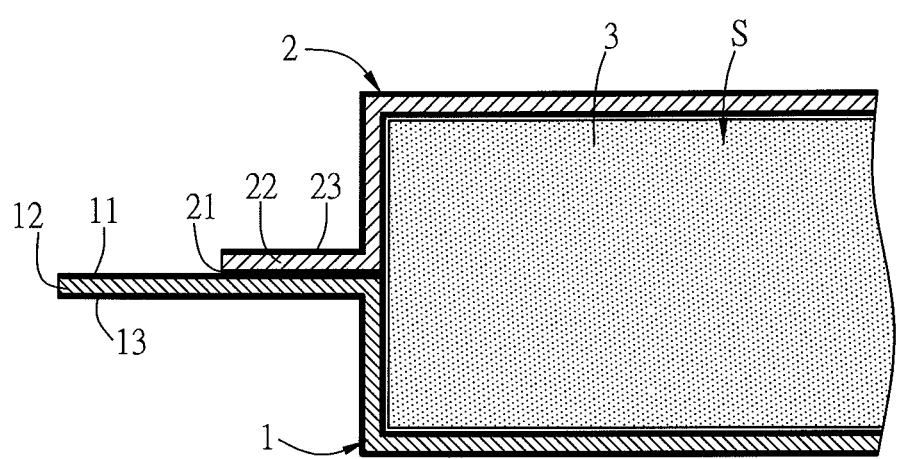
FIG. 2 is a sectional view of the battery of FIG. 1A along the line A-A.

FIG. 1A is a schematic diagram showing a battery according to a preferred embodiment of the invention, and FIG. 1B is an exploded view of the battery according to the preferred embodiment of the invention. Referring to FIGS. 1A and 1B, the battery B of the embodiment is a pouch lithium-ion battery and is substantially a square structure. The battery B includes a first sealing film 1, a second sealing film 2 and an electrode group 3. The peripheries of the first sealing film 1 and the second sealing film 2 are partially bonded to form a sealed chamber S (as shown in FIG. 2), i.e. a confined chamber with bound outside. The electrode group 3 is accommodated in the sealed chamber S, and the sealed chamber S is injected with an electrolyte. In other words, the first sealing film 1 and the second sealing film 2 encapsulate the electrode group 3 with the electrodes 31 and at least one of the electrodes 31 being exposed from inside of the sealed chamber S. To be noted, the arrangement of the electrodes 31 can be designed based on the requirement. For example, two electrodes 31 can be respectively located at opposite sides, or adjacent sides, or both located at the same side of the battery B, and this invention is not limited thereto.

FIG. 2 is a sectional view of the battery B of FIG. 1A along the line A-A. Referring to FIGS. 1A and 2, in this embodiment, the first sealing film 1 and the second sealing film 2 have a first surface 11 and a first surface 21, respectively. The area of the first surface 21 of the second sealing film 2 is smaller than that of the first surface 11 of the first sealing film 1. In other words, the sizes of the first sealing film 1 and the second sealing film 2 are different. Accordingly, when the first sealing film 1 and the second sealing film 2 together encapsulate the electrode group 3, the edge of the first sealing film 1 is protruded from the edge of the second sealing film 2. After bonding the first surface 11 of the first sealing film 1 and the first surface 21 of the second sealing film 2 by thermo-compression, a part (here means a redundant part) of the first surface 11 of the first sealing film 1 is remained without being bonded with the first surface 21 of the second sealing film 2 by thermo-compression. The redundant part of the first surface 11 can be used in the following thermo-compression bonding process or mechanical folding process.

In specific, the first sealing film 1 and the second sealing film 2 can include, for example but not limited to, a metal-based plastic film or other battery cell packing materials. For example, the metal-based plastic film is a multi-layer structure. That is, the first sealing film 1 can further include a metal layer 12 and a second surface 13, and the second sealing film 2 can further include a metal layer 22 and a second surface 23. In the first sealing film 1, the metal layer 12 is disposed between the first surface 11 and the second surface 13. In the second sealing film 2, the metal layer 22 is disposed between the first surface 21 and the second surface 23.

Furthermore, the first surfaces 11 and 21 can be thermoplastic layers, which can become flexible by heating and be solidified again by cooling. The material of the thermoplastic layer includes PVC, PE, PP, PS or any kind of their combinations. The material of the metal layers 12 and 22 can be, for example but not limited to, aluminum, copper, iron or nickel. The second surfaces 13 and 23 are waterproof layers or protective layers such as nylon layers.

Figure 3A:
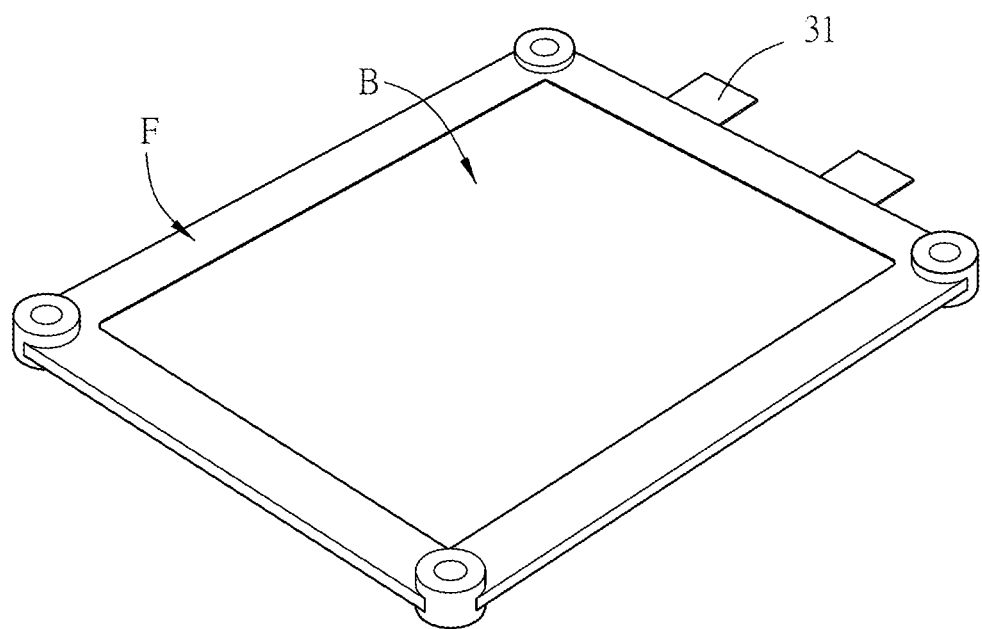
FIG. 3A is a schematic diagram showing the combination of the battery and the fixing member.
Figure 3B:
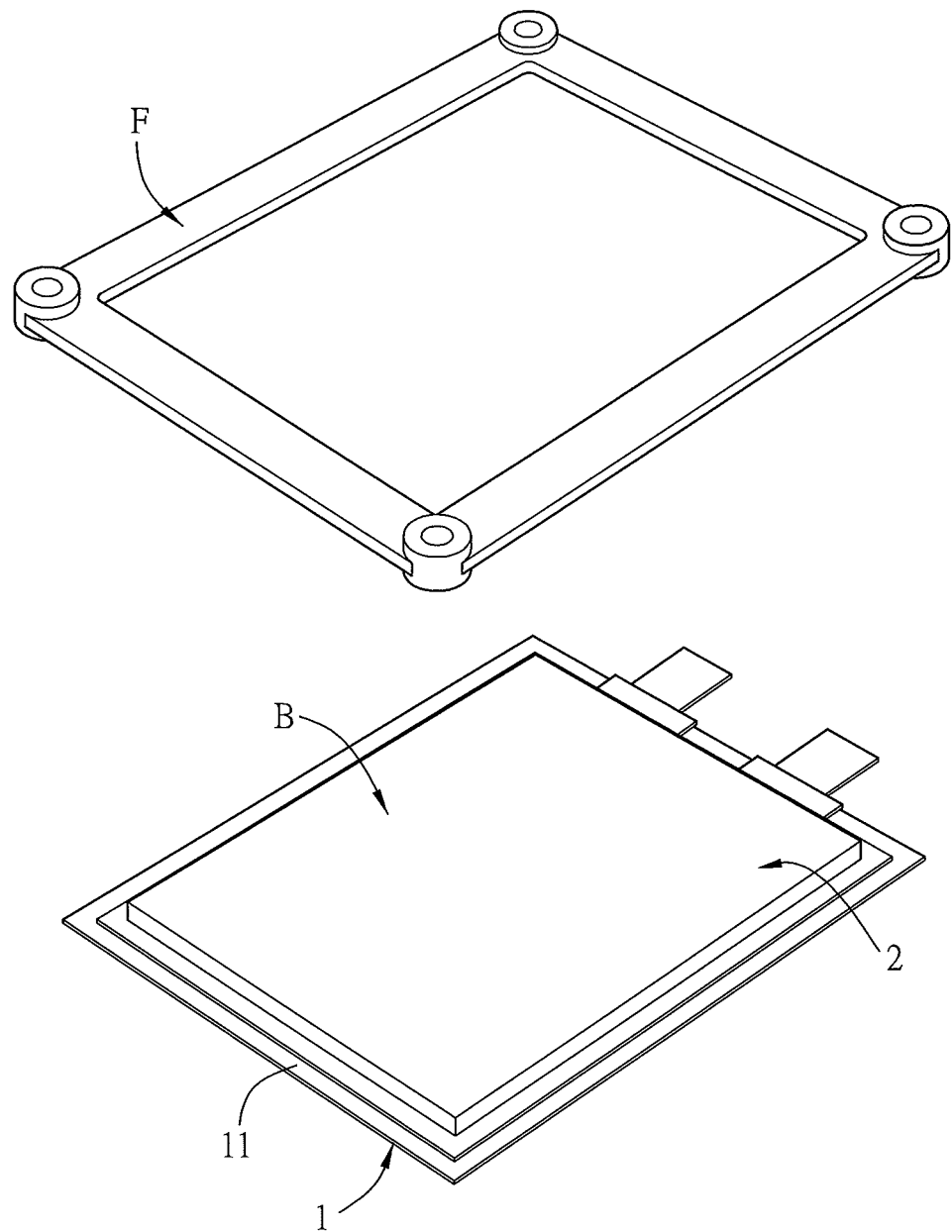
FIG. 3B is a schematic diagram showing the assembled structure of FIG. 3A.

FIG. 3A is a schematic diagram showing the combination of the battery and the fixing member, and FIG. 3B is a schematic diagram showing the assembled structure of FIG. 3A. Referring to FIGS. 2, 3A and 3B, in this embodiment, the first surfaces 11 and 21 of the first sealing film 1 and the second sealing film 2 are disposed opposite to each other. Accordingly, when the following thermo-compression process is performed, the thermoplastic layers of the first sealing film 1 and the second sealing film 2 can be heated and thus bonded. In this embodiment, the redundant part of the first surface 11 of the first sealing film 1, which is located outside the sealed chamber S, is not bonded by thermo-compression, so this redundant part of the first surface 11 of the first sealing film 1 can be later bonded with a fixing member F by thermo-compression. As a result, the battery B can be fixed or assembled on the fixing member F.

To be noted, the fixing member F shown in FIGS. 3A and 3B is a frame for example. In practice, the fixing member F can be the casing of the battery set or any other mechanism capable of fixing the battery B, and this invention is not limited thereto.

In the battery B as shown in FIG. 1A, the redundant part of the first sealing film 1 includes all four sides of the first surface 11. In practice, the redundant part of the first sealing film 1 may include only one side of the first surface 11 for bonding with the fixing member F by thermo-compression. Preferably, the redundant part of the first sealing film 1 may include two opposite sides of the first surface 11 for bonding with the fixing member F much firmly. Besides, the shape of the battery B can be any applicable shape such as circle, hexagon, or other geometrical shapes corresponding to the redundant part of the first surface 11, and this invention is not limited thereto.

Figure 4A:
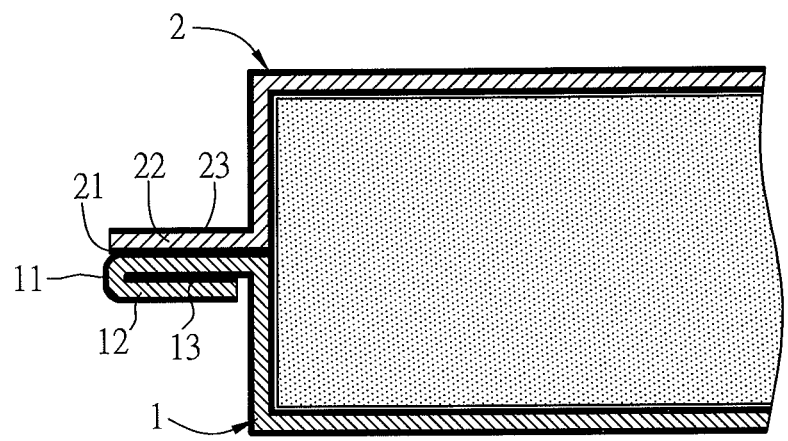
FIGS. 4A to 4D are schematic diagrams showing different aspects of the redundant parts of the first and second sealing films.
Figure 4B:
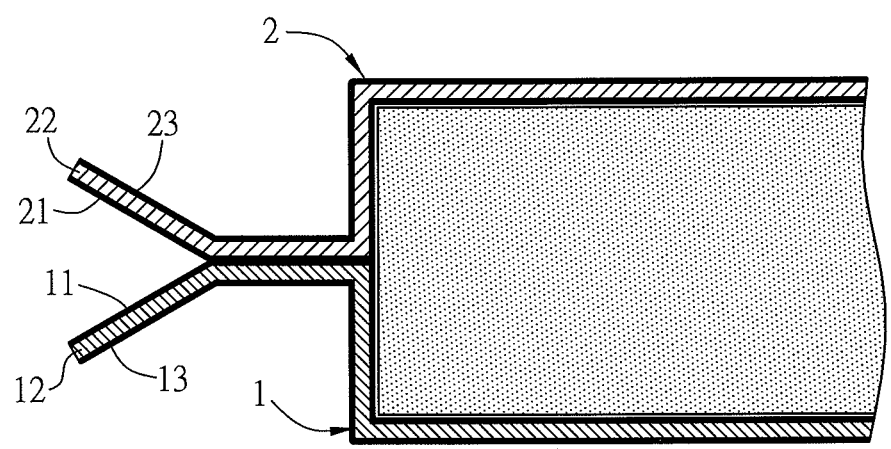
Figure 4C:
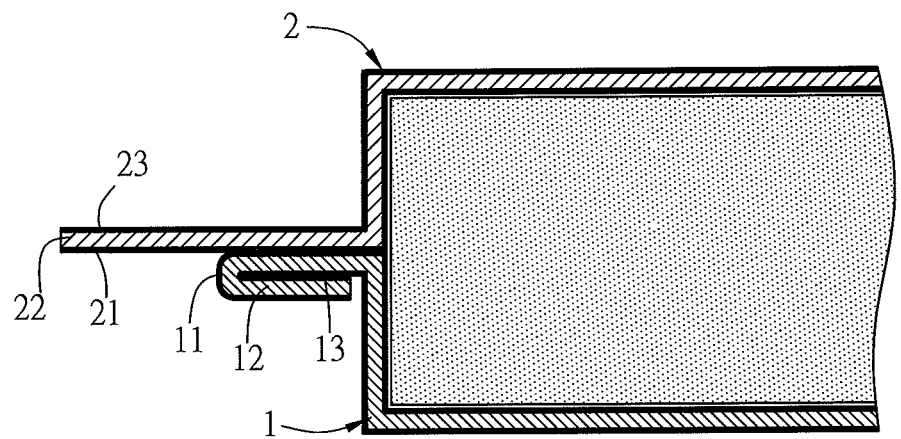
Figure 4D:
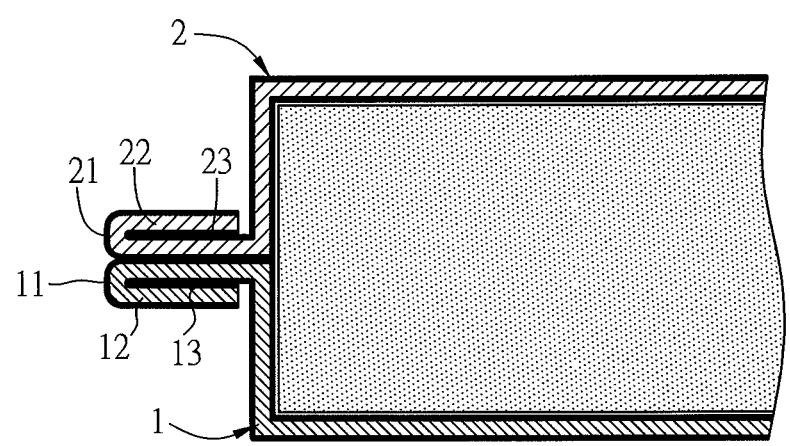

FIGS. 4A to 4D are schematic diagrams showing different aspects of the redundant parts of the first and second sealing films. In the aspect of FIG. 4A, the redundant part of the first surface 11 of the first sealing film 1 is folded backwardly, which means the redundant part is folded in the direction away from the first surface 21 of the second sealing film 2. In the aspect of FIG. 4B, the area of the first surface 11 of the first sealing film 1 is substantially equal to that of the first surface 21 of the second sealing film 2. When bonding the first sealing film 1 and the second sealing film 2 by thermo-compression, only the parts of the first sealing film 1 and the second sealing film 2 adjacent to the electrode group 3 are bonded by thermo-compression, so both of the first sealing film 1 and the second sealing film 2 have redundant parts without being bonded by thermo-compression. Alternatively, as shown in FIGS. 4C and 4D, the redundant part of the first sealing film 1 or the second sealing film 2 can be folded. The detailed procedure will be discussed hereinafter with reference to the flow charts of FIGS. 5A to 5E.

Figure 5A:
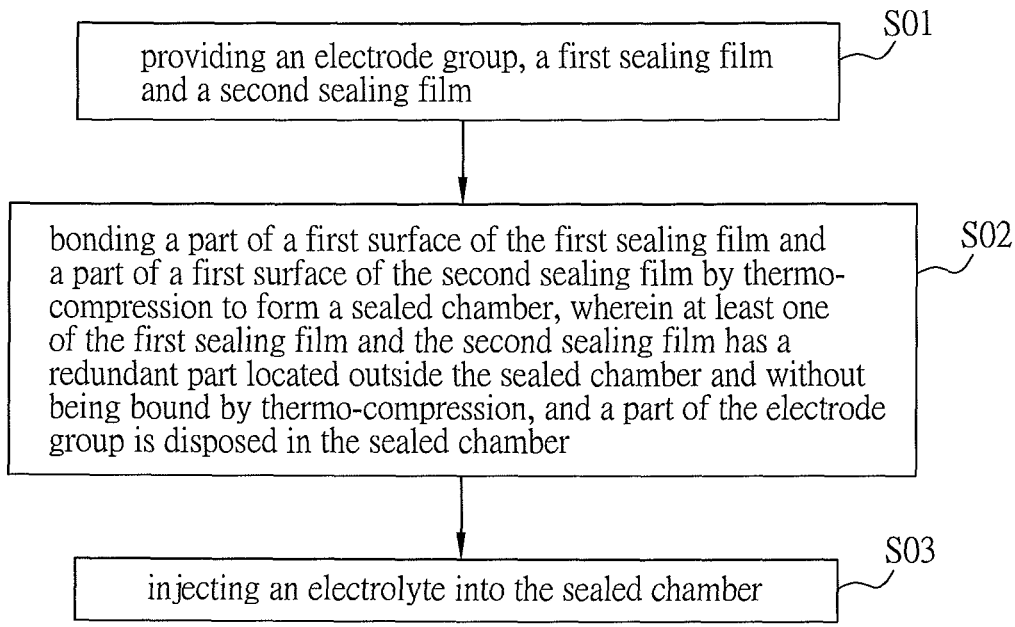
FIG. 5A is a flow chart of a fabrication method of a battery according to a preferred embodiment of the invention.

FIG. 5A is a flow chart of a fabrication method of a battery according to a preferred embodiment of the invention. Referring to FIG. 5A, the disclosed method is for fabricating the above-mentioned battery B. The components and structure of the battery B have been described above, so the detailed description thereof will be omitted. The fabrication method includes the following steps of: providing an electrode group, a first sealing film and a second sealing film (S01); bonding a part of a first surface of the first sealing film and a part of a first surface of the second sealing film by thermo-compression to form a sealed chamber, wherein at least one of the first sealing film and the second sealing film has a redundant part located outside the sealed chamber and without being bound by thermo-compression, and a part of the electrode group is disposed in the sealed chamber (S02); and injecting an electrolyte into the sealed chamber (S03).

In the step S02, at least one of the first sealing film 1 and the second sealing film 2 has a redundant part, which is not bound by thermo-compression and is configured for the later thermo-compression process, during the procedure for forming the sealed chamber S by thermo-compression. Herein, the redundant part can be provided on either the first sealing film 1 or the second sealing film 2, or both the first sealing film 1 and the second sealing film 2 have the redundant parts.

Figure 5B:
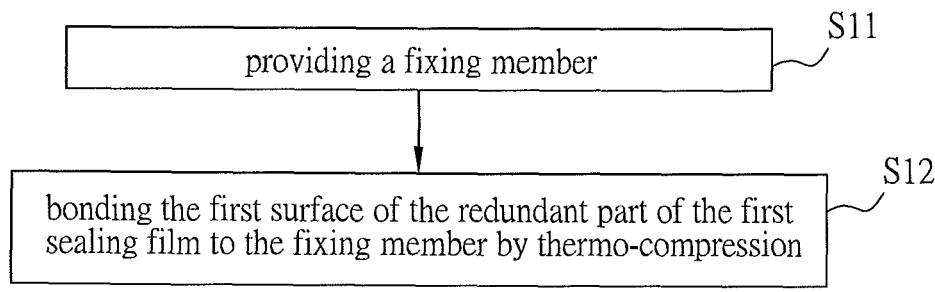
FIGS. 5B to 5E are flow charts showing different aspects of the fabrication method of a battery.

Referring to FIG. 5B, when the first sealing film 1 has the redundant part located outside the sealed chamber S and without being bound by thermo-compression, the method further includes steps of: providing a fixing member (S11); and bonding the first surface of the redundant part of the first sealing film to the fixing member by thermo-compression (S12). Herein, in the step S11, the fixing member F can be the casing of the battery set or any other mechanism capable of fixing the battery B. In the step S12, the first surface 11 of the first sealing film 1 is bonded with the fixing member F by thermo-compression, thereby fixing or assembling the battery B on the fixing member F.

Figure 5C:
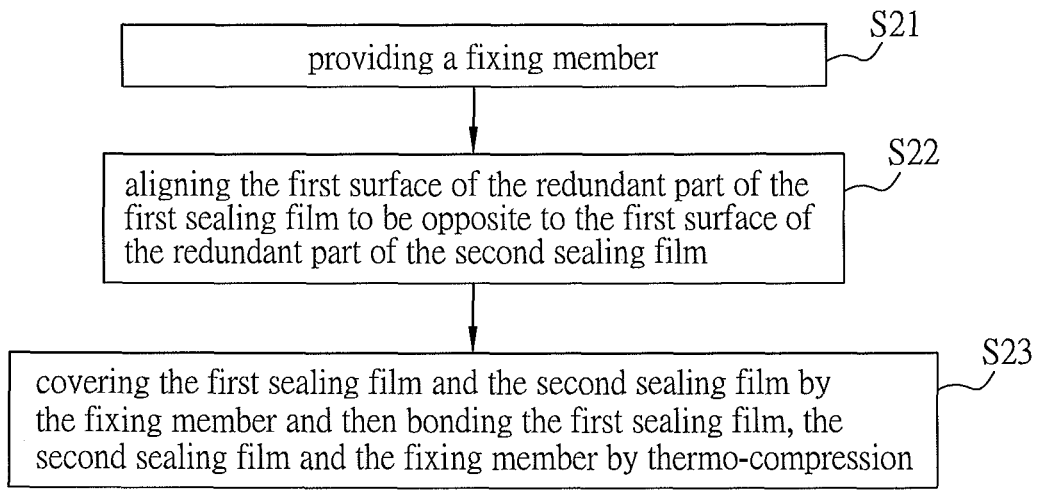

Referring to FIGS. 4B and 5C, when both of the first sealing film 1 and the second sealing film 2 have the redundant part located outside the sealed chamber S and without being bound by thermo-compression, the method further includes steps of: providing a fixing member (S21); aligning the first surface of the redundant part of the first sealing film to be opposite to the first surface of the redundant part of the second sealing film (S22); and covering the first sealing film and the second sealing film by the fixing member and then bonding the first sealing film, the second sealing film and the fixing member by thermo-compression (S23). The step S21 can be referred to the above-mentioned step S11, so the detailed description thereof will be omitted. In the step S22, after bonding the first surfaces 11 and 21 of the first sealing film 1 and the second sealing film 2 by thermo-compression to form a sealed chamber S, the first surface 11 is aligned opposite to the first surface 21. In the step S23, a part of the fixing member F is covered by both of the first sealing film 1 and the second sealing film 2, and a thermo-compression process is performed to fixing the battery B on the fixing member F.

Figure 5D:
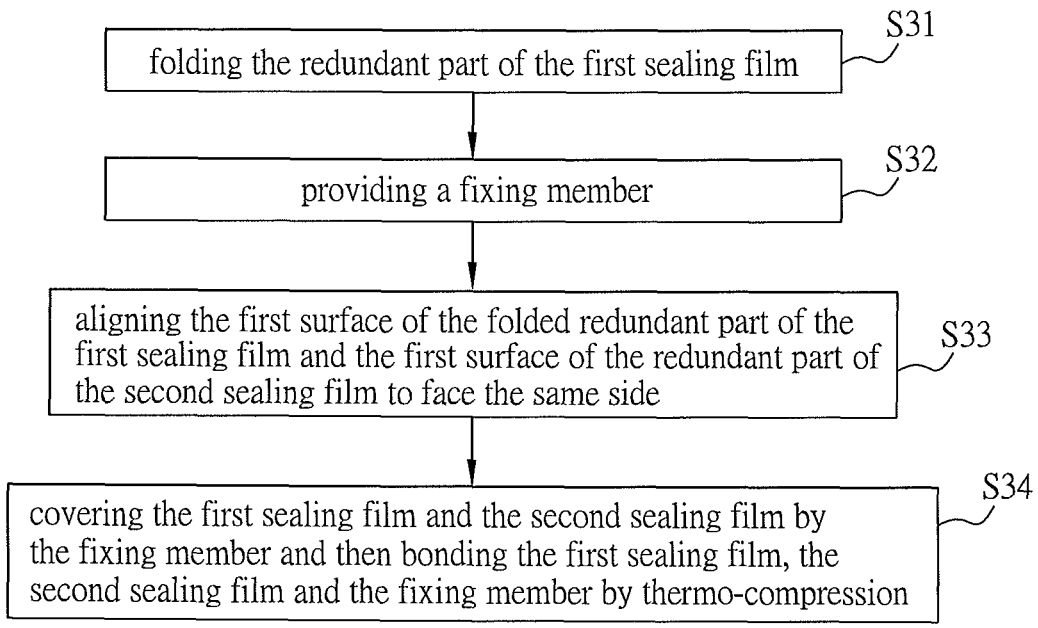

When the redundant parts of the first sealing film 1 and the second sealing film 2 located outside the sealed chamber S are not bonded by thermo-compression, the redundant part of the first sealing film 1 or the second sealing film 2 can be folded and then be bonded by thermo-compression. With reference to FIGS. 4C and 5D, the fabrication method further includes the steps of: folding the redundant part of the first sealing film (S31); providing a fixing member (S32); aligning the first surface of the folded redundant part of the first sealing film and the first surface of the redundant part of the second sealing film to face the same side (S33); and covering the first sealing film and the second sealing film by the fixing member and then bonding the first sealing film, the second sealing film and the fixing member by thermo-compression (S34). Since the redundant part of the first sealing film 1 is substantially folded by 180 degrees (step S31), the first surface 11 of the first sealing film 1 and the first surface 21 of the second sealing film 2 will face the same side (step S33). Afterwards, the fixing member F is provided to bond with the first surfaces 11 and 21 by thermo-compression (step S34). In specific, the first sealing film 1 is folded to make the first surfaces 11 and 21 face the same side, so that the bonding area between the battery B and the fixing member F can be increased, thereby improving the bonding force between the battery B and the fixing member F.

Figure 5E:
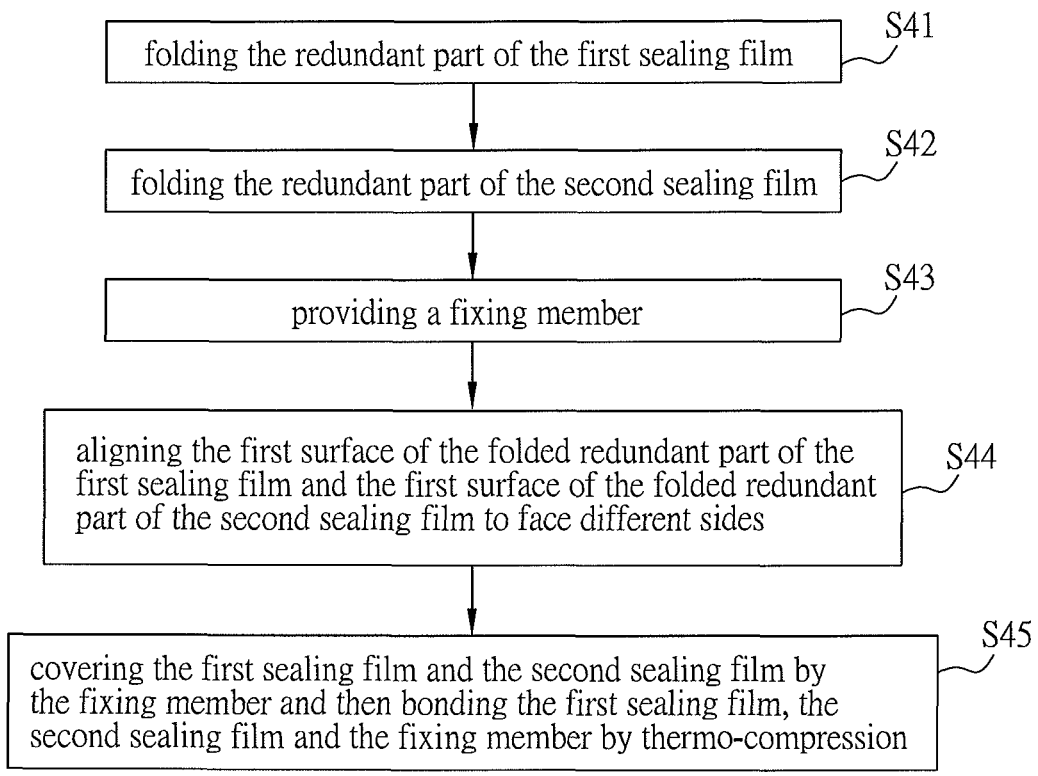

Of course, the second sealing film 2 can also be folded to change the direction of the first surface 21. With reference to FIGS. 4D and 5E, the fabrication method further includes the steps of: folding the redundant part of the first sealing film (S41); folding the redundant part of the second sealing film (S42); providing a fixing member (S43); aligning the first surface of the folded redundant part of the first sealing film and the first surface of the folded redundant part of the second sealing film to face different sides (S44); and covering the first sealing film and the second sealing film by the fixing member and then bonding the first sealing film, the second sealing film and the fixing member by thermo-compression (S45). Since the first sealing film 1 and the second sealing film 2 are folded (steps S41 and S42), the first surface 11 of the first sealing film 1 and the first surface 21 of the second sealing film 2 will face different sides (step S44). Accordingly, this aspect can provide two different bonding directions by thermo-compression (e.g. the direction of the first surface 11 of the first sealing film 1, or the direction of the first surface 21 of the second sealing film 2) so as to increase the freedom of the thermo-compression process.

Besides, the first sealing film 1 and the second sealing film 2 can be integrated as a single structure. For example, a single sealing film is folded to cover an electrode group, and the part of the sealing film without covering the electrode group is partially bonded by thermo-compression. Then, the redundant part of the single sealing film, which does not cover the electrode group and is not bonded by thermo-compression, can be used in the following step for bonding with the fixing member by thermo-compression.

In summary, the fabrication method of a battery of the invention is to bond a part of the first sealing film and a part of the second sealing film by thermo-compression and to remain at least one of the first sealing film and the second sealing film to have a redundant part without being bonded by thermo-compression. Accordingly, it is possible to bond the redundant part with other mechanical member by thermo-compression so as to fix or assemble the battery. Accordingly, it is also possible to fold the redundant part so as to fix or assemble the battery.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A fabrication method of a battery, comprising steps of:
   providing an electrode group, a first sealing film and a second sealing film;
   bonding a part of a first surface of the first sealing film and a part of a first surface of the second sealing film by thermocompression to form a sealed chamber, wherein the first surface of the first sealing film is disposed toward the first surface of the second sealing film, each of the first sealing film and the second sealing film has a redundant part located outside the sealed chamber and without being bonded by thermo-compression, and a part of the electrode group is disposed in the sealed chamber;
   injecting an electrolyte into the sealed chamber;
   folding the redundant part of the first sealing film with an angle of 180 degrees;
   folding the redundant part of the second sealing film with an angle of 180 degrees;

providing a fixing member;

aligning the first surface of the folded redundant part of the first sealing film and the first surface of the folded redundant part of the second sealing film to face different sides;

covering the folded redundant parts of the first sealing film and the second sealing film by the fixing member to fix the sealed chamber; and bonding the folded redundant part of the first sealing film, the folded redundant part of the second sealing film and the fixing member by thermo-compression.

2. The method of claim 1, wherein the first surface of the first sealing film and the first surface of the second sealing film are thermoplastic layers.

3. The method of claim 2, wherein the thermoplastic layer is selected from a group consisting of polyvinyl chloride, polyethylene, polypropylene or polystyrene.

4. The method of claim 1, wherein each of the first sealing film and the second sealing film has a second surface, and the second surfaces are waterproof layers or protective layers.

5. The method of claim 4, wherein each of the first sealing film and the second sealing film further has a metal layer, wherein the metal layer of the first sealing film is disposed between the first surface and the second surface of the first sealing film, and wherein the metal layer of the second sealing film is disposed between the first surface and the second surface of the second sealing film.

6. The method of claim 5, wherein the metal layer is made of aluminum, copper, iron or nickel.

7. The method of claim 1, wherein the first sealing film and the second sealing film are integrally formed.

* * * * *